May 6, 1952  H. H. SMELTZ  2,595,989
FISHMOUTH HOLDING TOOL
Filed Jan. 24, 1949
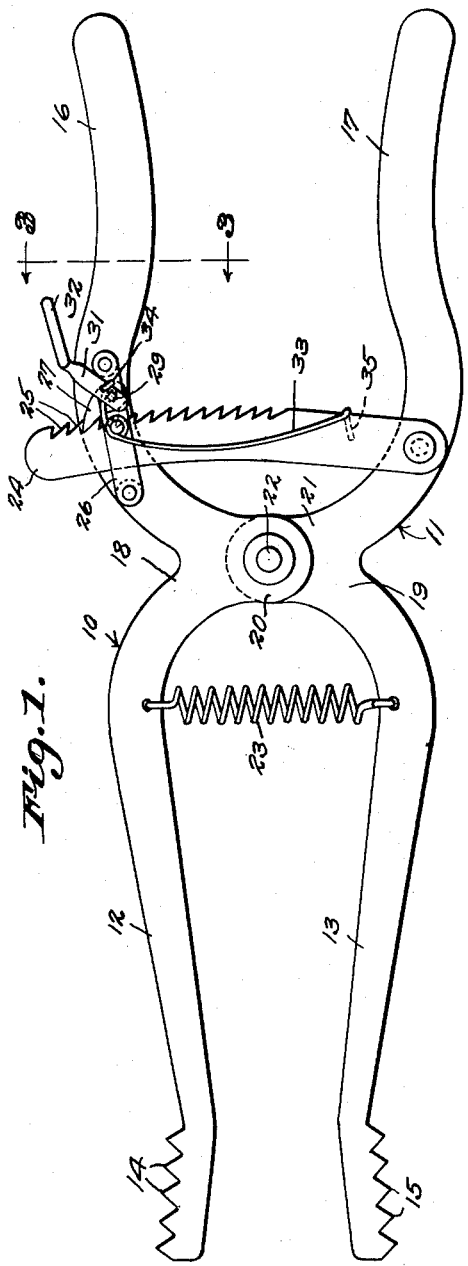
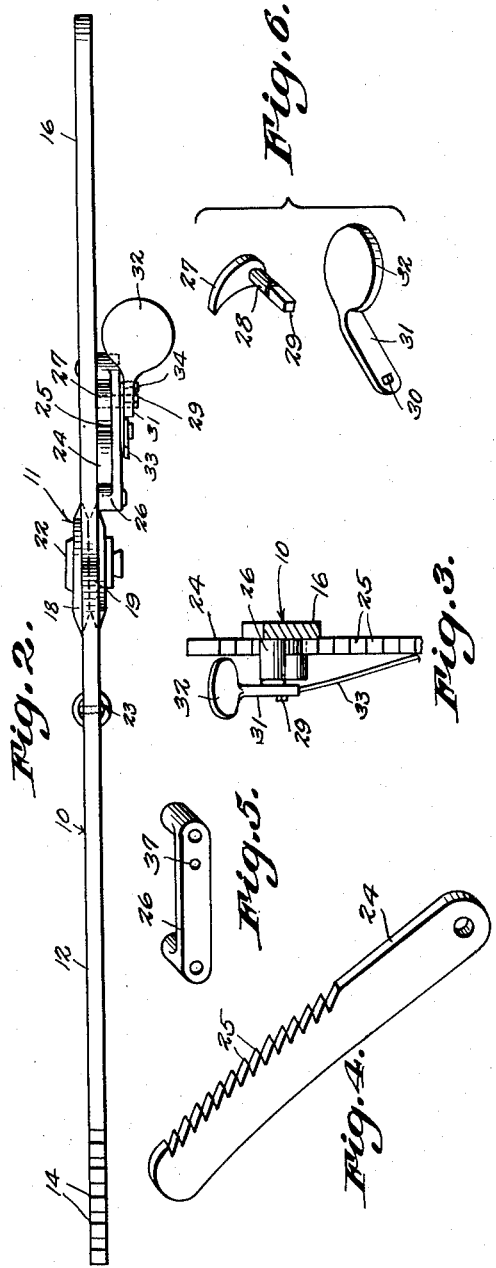
H. H. Smeltz
INVENTOR
BY C. A. Snow & Co.
ATTORNEYS.

Patented May 6, 1952

2,595,989

UNITED STATES PATENT OFFICE 2,595,989

FISHMOUTH HOLDING TOOL

Harry H. Smeltz, Baden, Pa.

Application January 24, 1949, Serial No. 72,296

1 Claim. (Cl. 43—53.5)

My invention relates to tools adapted to be inserted in a mouth of a fish and thereafter spread to hold the fish mouth open for the purpose of extracting a hook or lure therefrom. Likewise, the tool according to the invention comprises a convenient means for holding a fish for the purpose of scaling or cleaning the same.

With the foregoing in view, it is an object of my invention to provide an improved fish mouth-opening and holding tool.

A further object is to provide an improved fish mouth-opening and holding tool which includes a pair of lever arms rockably connected together intermediate their ends to provide a pair of forwardly-directed, normally-closed fish mouth-opening jaws at one side of the pivot and a pair of normally-spread handles rearwardly of the pivot.

A further object is to provide an improved tool such as that last described which includes means for releasably locking the same with the jaws in a selected open position.

Other objects and advantages reside in the particular structure of the invention, combination and arrangement of the several parts thereof, and will be readily apparent to those skilled in the art upon reference to the attached drawing in connection with the following specification, wherein the invention is shown, described and claimed.

In the drawing:

Figure 1 is a plan view of the tool of the invention;

Figure 2 is an elevational view thereof looking downwardly on Figure 1;

Figure 3 is a fragmentary transverse vertical sectional view taken substantially on the plane of the line 3—3 of Figure 1;

Figure 4 is a perspective view of an element of the tool apart from the rest of the structure;

Figure 5 is a perspective view of a second element of the tool apart from the rest of the structure;

Figure 6 is an exploded perspective view of a further element of the tool apart from the rest of the structure.

Referring specifically to the drawing, wherein like reference characters have been used throughout the several views to designate like parts, 10 and 11 represent, respectively, a pair of similar lever arms, each of which is provided with a forwardly-directed jaw 12 or 13, the opposite outer edges of which at the free ends thereof are formed with serrations 14 and 15 providing teeth for engaging opposite portions of a fish mouth to retain the jaws therein. The rear ends of the lever arms 10 and 11 are formed to provide handles 16 and 17, respectively. Intermediate portions of the lever arms 10 and 11 are oppositely laterally offset, as at 18 and 19, Figure 2, and laterally inwardly directed toward each other so as to provide overlapped ears 20 and 21. Any suitable pivot means 22 is journaled in the overlapped ears 20 and 21 to rockably connect the lever arms 10 and 11 together. Any suitable spring means 23 is operatively connected to both lever arms 10 and 11 so as to load the jaws 12 and 13 together to a closed position.

In view of the fact that the spring 23 normally loads the jaws 12 and 13 to a closed position, means now to be described have been provided to releasably lock the jaws in a selected opened position. Thus, the device contemplates a ratchet 24 carried by one handle 17 and slidably extending across the other handle 16 adjacent the pivot 22. The ratchet 24 is provided with teeth 25 on its rear edge and is slidably retained against the handle 12 by any suitable keeper 26. A dog 27 is engageable with the teeth 25 and includes a shaft 28 pivoted in the keeper through a hole 37 formed therein. The free end of the shaft is squared, as at 29, and has a press fit in the squared opening 30 of a trigger lever 31. The rear or free end of the trigger is formed to provide a thumb piece 32 whereby to provide a thumb trigger for releasing the dog 27 from the teeth 25 upon rocking of the shaft 28 of the dog in a clockwise direction, Figure 1. The teeth 25 are directed away from the handle 16, whereby the dog 27 serves to lock the handles 16 and 17 in a selected closed or partially closed position, whereby the jaws 12 and 13 are releasably locked in a selected opened position. A spring 33 is provided to load the dog 27 in a ratchet-engaging direction. In the embodiment illustrated, the spring 33 comprises a coil spring having the free end 35 of one arm hooked over the ratchet or transverse arm 24 with the free end 34 of the other arm hooked about the trigger lever arm 31. Thus, the spring 33 loads the dog in a counterclockwise direction so that it normally engages the ratchet teeth 25. Obviously, with the teeth disposed as described, free closing movement of the handles and the consequent spreading of the jaws are permitted against the action of the spring 33, but closing of the jaws is prevented by the dog 27. Thus, when the device is inserted in a fish's mouth, it is a simple matter to press the handles 16 and 17 together to open the fish's mouth to any desired degree and retain the same in such open position until the lure or fish hook is removed. Likewise, the handles 16 and 17 thereafter provide a convenient means for holding the fish while the same is scaled or cleaned. After the hook or lure is removed from the fish's mouth, a slight pressure on the thumb piece 32 of the trigger disengages the dog 27 from the ratchet teeth 25, whereby the spring 23 is effective to close the jaws 12 and 13 and permit ready withdrawal of the tool from the fish's mouth.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

An implement for insertion into the mouth of a fish and holding the mouth open comprising a pair of elongated jaw members mounted to move about a common axis, outwardly extending fish mouth engaging teeth carried by the jaw members adjacent the ends thereof remote from the common axis, a retractile coiled spring connected at opposite ends to the jaw members between the common axis and the teeth for yieldingly urging the jaw members to close, handles carried by the jaw members and projecting therefrom in a direction away from the common axis, a U-shaped guide carried by one of the handles adjacent the common axis and on the other side of the axis from the spring, a ratchet bar carried by the other handle adjacent the common axis and extending across the other handle and through the guide, a latch dog pivotally carried by the guide for engaging the ratchet bar for holding the jaws against movement about the common axis under the influence of the coiled spring, a thumb lever connected to the latch dog for movement therewith, a torsion spring carried by the guide, an arm carried by the torsion spring and engaging the ratchet bar adjacent its pivotal connection to its respective handle, and an arm carried by the torsion spring and engaging the thumb lever for rocking said thumb lever and advancing the latch dog into engagement with the ratchet bar.

HARRY H. SMELTZ.

REFERENCES CITED

The following references are of record in the file of this patent:

UNITED STATES PATENTS

| Number | Name | Date |
|---|---|---|
| D. 152,478 | Hutchinson et al. | Jan. 25, 1949 |
| 1,276,815 | Ruthven | Aug. 27, 1918 |
| 1,651,998 | Clerico | Dec. 6, 1927 |
| 1,952,990 | Kirsch | Mar. 27, 1934 |
| 2,481,007 | Dugdale | Sept. 6, 1949 |